June 5, 1928. 1,672,695
R. J. O. SIMPSON
ANGLE GAUGE
Filed June 5, 1923
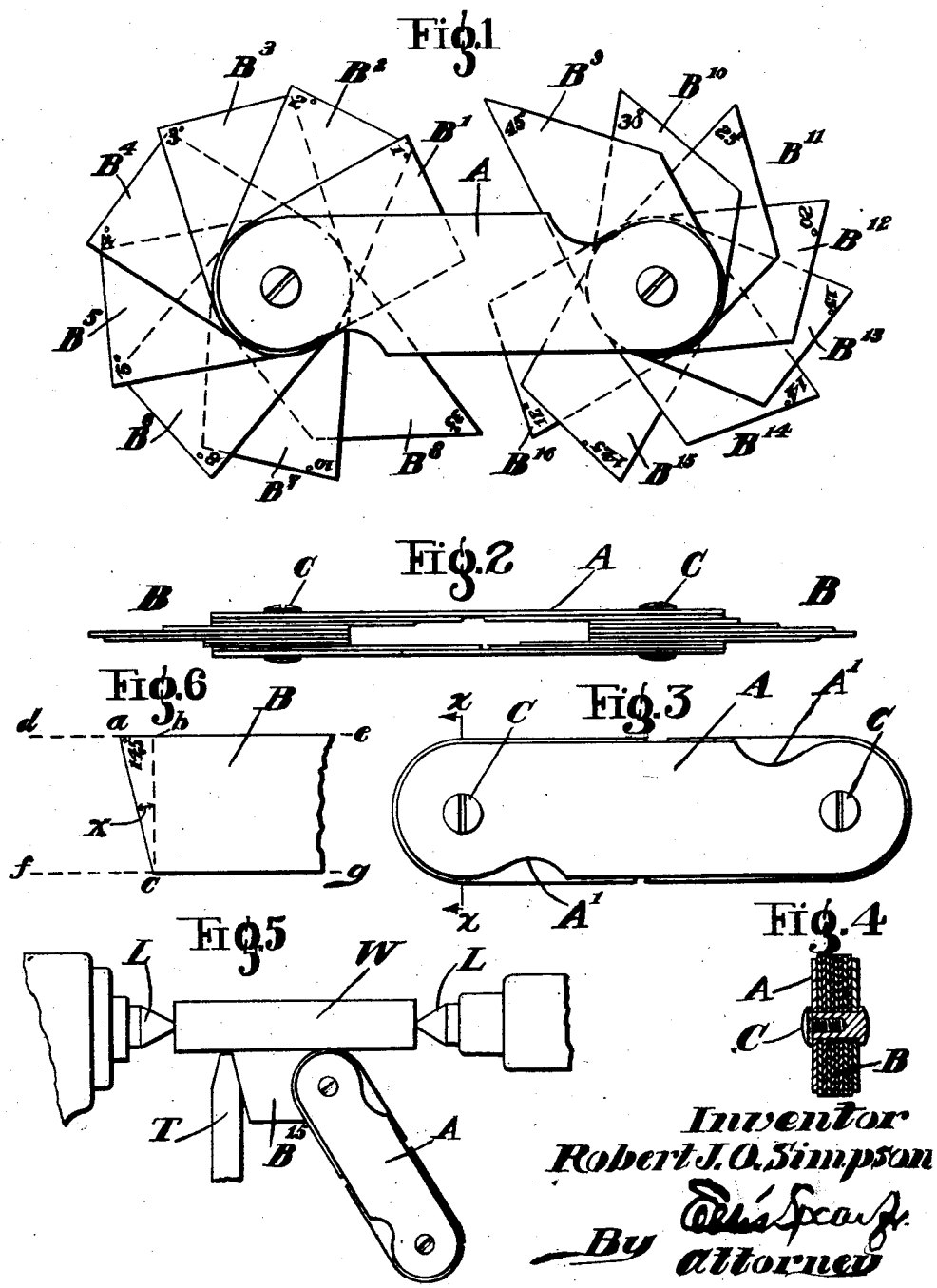
Inventor
Robert J. O. Simpson
By Ellis Spear Jr.
Attorney Patented June 5, 1928.

1,672,695

UNITED STATES PATENT OFFICE.

ROBERT J. O. SIMPSON, OF ATHOL, MASSACHUSETTS, ASSIGNOR TO THE L. S. STARRETT COMPANY, OF ATHOL, MASSACHUSETTS, A CORPORATION OF MASSACHUSETTS.

ANGLE GAUGE.

Application filed June 5, 1923. Serial No. 643,484.

In the laying out or testing of machine work and other mechanical operations the mechanic frequently desires to gauge certain definite angles by a positive gauge and by this I mean to distinguish a fixed gauge from an adjustable scale or micrometer instrument.

Various gauges of this type have been provided but they have been for the most part gauges in which the angle was a positive angle. In accordance with the principles of my present invention I contemplate the provision of a gauging side or face of the desired angularity having reference to a pair of parallel straight edges on the gauge to which the gauging edge has the relation of a secant whose angularity reads from the perpendicular secant drawn to its own point of intersection with one of the parallel edges.

My gauge which preferably takes the form of a multiple leaf instrument is made to supply a considerable range of graduated angles of related values to each other and with special reference to those fundamental angles which are apt to appear in standard machine work.

Throughout the specification and drawings like reference characters are employed to indicate corresponding parts, and in the drawings:

Fig. 1 shows a view of a preferred form of gauge in accordance with my invention with the blades opened up to display their variety and form.

Fig. 2 is an edge view of such a gauge.

Fig. 3 is a side view with the blades closed.

Fig. 4 is a section on the line $x$—$x$, of Fig. 3.

Fig. 5 is a diagrammatic showing of an illustrative form of use, and

Fig. 6 a somewhat diagrammatic study of one of the blades from a geometrical point of view.

In a preferred form of my invention which I have shown in the accompanying drawings as illustrative of a convenient embodiment, a pair of side blades A are provided for forming a handle member. In each end of this handle is pivoted as at C a plurality of blades $B^1$, $B^2$—$B^{15}$, $B^{16}$. These blades will be seen to each comprise a pair of parallel side edges which constitute straight edges and an end bevel formed by a secant edge. These blades are all of different angularity the angularity being indicated on each blade.

The blades are preferably formed with particular reference to an angle which I have indicated in Fig. 6 as $x$. In that figure I have taken a characteristic blade B and treated it somewhat from a geometrical point of view. I have extended the edge $e$—$a$ as shown at the dotted line $a$—$d$ and the edge $a$—$c$ as shown at the dotted line $g$—$f$. The line of the edge $a$—$c$ is therefore a secant to these two parallels whereby the alternate interior angles are equal and the adjacent angles on the theoretical edges are supplementary. The line $b$—$c$ is perpendicular to the two parallel edges drawn to the point $c$. This is somewhat the shorter of the actual physical edges of the blade. The triangle $a$—$b$—$c$ is therefore a right triangle in which the angle $x$, that is to say, $a$—$c$—$b$, is equal to the predetermined gauging angle of this blade (which is $14\frac{1}{2}°$) plus $90°$ or the adjacent theoretical right angle $b$—$c$—$g$.

To those skilled in the art the possibilities of this system of gauging with reference to parallel edges will be immediately seen for a great variety of jobs where lines are either to be laid out or surfaces to be tested.

In Fig. 5 I have illustrated the use of my gauge in measuring the set of a tool T with reference to a piece of work such as W which in this case is diagrammatically held between a pair of lathe centers L. In this form, for example, the tool T is to cut an angular groove which for the purpose of illustration is selected as $29°$ or the angularity of the standard Acmé thread. The workman therefore has selected in the illustration in Fig. 5 blade $B^{15}$ placing the longer of its two parallel sides against the work and its end against the angle of the tool T. Instead therefore of measuring or gauging the actual angle between the tool T and the work W which would be in this example the $75\frac{1}{2}°$ angle which would of course be a rather unusual angle to have to provide for. He is measuring one-half of his standard $29°$ angle with his $14\frac{1}{2}°$ angle blade which by reason of its smaller angularity is capable of building up a variety of odd angles.

In general structure the handle A is conveniently notched as at $A^1$ to give access to the edge of the blades and the blades fit within the handle as indicated in Fig. 3, making the gauge a convenient one for pocket or tool chest when not in use. The predetermined angle of the gauges may be marked in any suitable place and in any suitable manner, but I preferably locate such marking adjacent the end of each blade although of course this must not be misunderstood as indicating the angle of the tip but the angle of the base line $b$—$c$ shown in Fig. 6, which may or may not be actually engraved upon the blade.

The blades B are made of slightly greater width than the handle A so that their nicely ground parallel edges extend very slightly beyond the edges of the handle A. These blades are rounded off also in conformity to the rounded ends of the handle. In this way in whatever position the blade is placed with reference to the handle either of its parallel edges will be clear of the edge of the handle or the rounded end of the handle so that the exact conformity of the work to the parallel edge may be seen throughout its entire length.

The number of blades and their angularity may be variously modified according to the character of the work to be done and according to the various standards of the place or the period in which the gauge is to be used. The handle may also be variously shaped or constructed or the blades may be either furnished separately in sets or otherwise arranged or assembled or disassembled condition all without departing from the spirit of my invention if within the limits of the appended claims.

What I therefore claim and desire to secure by Letters Patent is:

1. In a gauge of the class described, a handle member and a plurality of blades pivotally mounted thereon, each blade having a pair of parallel longitudinal edges and an end edge disposed at an angle thereto, the end angles of the several blades being of different angularity with reference to the longitudinal edges of the blades and the said blades also being of slightly greater width than the width of the handle.

2. In a gauge of the class described, a blade-receiving handle having its side walls formed with a straight edge and a semi-circular end, a gauge blade pivoted centrally of said end, said gauge blade having one of its edges formed as a straight edge and of a width greater than the radius of said semi-circular end.

3. In a gauge of the class described, a plurality of blades each having a longitudinal straight edge and an edge disposed at an angle thereto, the end angles of the several blades being of different angularity with reference to the longitudinal edge and each marked with the degree of angularity of an angle which is a complement of the angle which the end edge makes with the longitudinal straight edge.

In testimony whereof I affix my signature.

ROBERT J. O. SIMPSON.